(12) United States Patent
Pastore

(10) Patent No.: US 8,535,184 B2
(45) Date of Patent: Sep. 17, 2013

(54) SYSTEM AND METHOD FOR A REMOVABLE WHEEL DEVICE

(76) Inventor: Joseph Pastore, Gilbert, AZ (US)

( * ) Notice: Subject to any disclaimer, the term of this patent is extended or adjusted under 35 U.S.C. 154(b) by 141 days.

(21) Appl. No.: 12/950,225

(22) Filed: Nov. 19, 2010

(65) Prior Publication Data

US 2011/0275461 A1 Nov. 10, 2011

Related U.S. Application Data

(60) Provisional application No. 61/395,287, filed on May 10, 2010.

(51) Int. Cl.
*A63B 63/00* (2006.01)

(52) U.S. Cl.
USPC .......................................................... 473/478

(58) Field of Classification Search
USPC ............... 473/478; 16/22; 280/11.208, 7.13, 280/79.2, 79.3, 841; 36/7.3
See application file for complete search history.

(56) References Cited

U.S. PATENT DOCUMENTS

| | | | | |
|---|---|---|---|---|
| 422,729 | A * | 3/1890 | Clark | 248/129 |
| 1,017,799 | A * | 2/1912 | Read | 16/30 |
| 1,061,912 | A * | 5/1913 | Hilfrank | 16/18 R |
| 1,171,569 | A * | 2/1916 | Wanda | 16/30 |
| 1,530,116 | A * | 3/1925 | Hawkins | 5/98.3 |
| 1,532,064 | A * | 3/1925 | Neiswender | 16/21 |
| 1,895,882 | A * | 1/1933 | Herold | 16/21 |
| 2,361,592 | A * | 10/1944 | Bjork | 114/344 |
| 2,790,196 | A * | 4/1957 | Rideout et al. | 16/30 |
| 2,800,679 | A * | 7/1957 | Schultz, Jr. | 16/29 |
| 2,834,608 | A * | 5/1958 | Wixson | 280/767 |
| 3,879,798 | A * | 4/1975 | Krulwich | 16/18 R |
| 4,028,773 | A * | 6/1977 | Morgan | 16/35 R |
| 4,134,598 | A * | 1/1979 | Urisaka | 280/842 |
| 4,135,725 | A | 1/1979 | DiRoma | |
| 4,351,540 | A * | 9/1982 | Minnebraker | 280/250.1 |
| 4,843,678 | A | 7/1989 | Park | |
| 5,018,930 | A * | 5/1991 | Hardin et al. | 414/458 |
| 5,088,799 | A * | 2/1992 | Redmon et al. | 301/111.05 |
| 5,273,292 | A | 12/1993 | Pardi et al. | |
| 5,330,064 | A * | 7/1994 | Hall | 211/182 |
| 5,428,866 | A * | 7/1995 | Aschow | 16/30 |
| 5,531,463 | A * | 7/1996 | Givens | 280/47.2 |
| 5,599,031 | A * | 2/1997 | Hodges | 280/79.11 |
| 5,740,584 | A * | 4/1998 | Hodge et al. | 16/30 |
| 6,450,515 | B1 * | 9/2002 | Guth | 280/79.11 |
| 6,595,334 | B1 | 7/2003 | Saetia | |
| 6,721,970 | B1 * | 4/2004 | Cheng | 5/99.1 |
| 6,942,735 | B2 * | 9/2005 | Rich | 118/313 |
| 7,328,907 | B1 * | 2/2008 | Bileth | 280/79.11 |

(Continued)

*Primary Examiner* — Gene Kim
*Assistant Examiner* — M Chambers
(74) *Attorney, Agent, or Firm* — Lisa Foundation Patent Law Clinic, Arizona State University

(57) ABSTRACT

A removable wheel device which slides onto the base of a sports field goal. The wheel device allows one person to move a goal across a field without using excessive force by sliding one wheel device onto the base of each goalpost and using leverage to tilt the goal and push or pull it for a distance. When inserted onto the base of the goal, the wheel device does not require any type of fastening to remain in place, but rather uses its own unique shape to hold onto the goal. In one embodiment the removable wheel device comprises a wheel, a bracket, and a U-shaped sleeve which may slide onto the base of a lacrosse goalpost.

7 Claims, 4 Drawing Sheets

(56) References Cited

U.S. PATENT DOCUMENTS

| | | |
|---|---|---|
| 7,506,404 B2 | 3/2009 | Block et al. |
| 7,647,673 B2 | 1/2010 | Melara |
| 2003/0127815 A1* | 7/2003 | Hall .............................. 280/79.3 |
| 2007/0103040 A1* | 5/2007 | Barrett et al. ................. 312/279 |
| 2011/0275461 A1* | 11/2011 | Pastore ......................... 473/478 |

* cited by examiner

SYSTEM AND METHOD FOR A REMOVABLE WHEEL DEVICE

CROSS REFERENCE TO RELATED APPLICATION

This application claims priority to U.S. Provisional Application No. 61/395,287 filed on May 10, 2010 entitled "Lacrosse Goal Carrier 'Goal Caddie'" which is herein incorporated entirely by reference.

BACKGROUND OF THE INVENTION

1. Field of the Invention

This invention is generally in the field of detachable wheeled supporting devices for the goal frame in a field game.

2. Description of Related Art

Goals for a field game, such as soccer, lacrosse, or hockey, are not readily moveable, especially by a single person. Traditionally, wheels or caster assemblies are attached by welding or screwing to the bottom of a heavy object to make the object movable. However, welding or screwing wheels or caster assemblies to a goal frame would damage the body of the goal. Mounting the wheels or caster assemblies to the goal frame may also change the measure of the goal, making the dimension incompliant to the official measure for that game, if the goal is not designed to accommodate the wheels or caster assemblies.

So as to reduce the complexity and length of the Detailed Specification, and to fully establish the state of the art in certain areas of technology, Applicant herein expressly incorporates by reference all of the following materials identified in each numbered paragraph below.

U.S. Pat. No. 5,273,292 (1993) describes a portable soccer goal assembly that comprises a plurality of rollers or wheels mounted on the outrigger to facilitate the movement of the goal frame. The rollers or wheels may be retractable when the goal is in use. However, these rollers or wheels are part of the design of the portable soccer goal, rather than detachable devices accommodated to goals made by different manufactures.

U.S. Pat. No. 4,843,678 (1989) describes a caster pad that is attachable to the bottom of a receptacle and adapted to receive and hold a replaceable caster assembly. The caster pad comprises a rectangular base with a flange at each of its four edges and a U-shaped rod. The rectangular base is attached to the bottom of the receptacle with screws, bolts or rivets. With the U-shaped rod entering the holes of one flange and extending out of the holes of the opposite flange, the plate of the replaceable caster assembly is captured between the rectangular base and the arms of the U-shaped rod.

U.S. Pat. No. 5,740,584 (1998) describes a releasable caster holder that is welded to a heavy, unwieldy object with a frame and is mounted to a removable caster. The frame of the caster holder comprises two end walls and two side walls. The caster holder does not have a pad portion in order to reduce its weight.

Applicant believes that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant will amend the specification to expressly recite the essential material that is incorporated by reference as allowed by the applicable rules.

BRIEF SUMMARY OF THE INVENTION

The present invention provides among other things a system and a method of a removable wheel device. It is an objective of this invention to make a goal for a field game movable over a flat surface or a rough terrain of a sports field by attaching one or more removable wheel devices to the bottom of the goal. The above objective may be achieved using a removable wheel device comprising a sleeve with at least a base, one or more support(s), and at least one cantilevered member, as well as a wheel with an axle, and a bracket connecting the axle of the wheel and the base of the sleeve. This objective may also be achieved using methods involving assembling the removable wheel device aforementioned.

In one example of this invention, the support of the sleeve comprises at least one sidewall. In another embodiment, the sleeve has an opening at the back of the device so that the device can slide over a bottom corner of the goal frame. With the opening, the space inside the sleeve, formed by the base, the support, and the cantilevered member, is designed to be sufficient to hold the bottom of the goal frame. Moreover, the cantilevered member may be U-shaped with an arced portion in the front of the sleeve to prevent the goal frame from passing through in certain embodiments. And the width between the opposite arms of the U-shaped cantilevered member is sufficient to allow the device to slide around the substantially vertical pipe of the goal frame, but is not wide enough for the bottom of the goal frame to pass. However, the widths of the two arms of the U-shaped cantilevered member may be different to accommodate goal frames that have a vertical pipe offset from the center position of the bottom.

In addition, the sleeve and/or the bracket may be made of any material, such as steel or any composite material, which is able to support the stress and weight of the goal. The bracket may be attached to the bottom of the sleeve permanently, or it can be removable from the sleeve by any methods known to any person skilled in the relevant art, including using screws or bolts. The bracket can also be rotatable in some embodiments, so that the wheel can face any direction. For the rotating bracket, there can be a locking mechanism to maintain the position of the bracket and the wheel.

Alternatively, the objective may be achieved using a removable wheel device, comprising a wheel with an axle, a bracket coupled to the axle of the wheel, and a sleeve which has at least one base and one or more member(s) extending from a portion of a perimeter of the base in a direction away from the wheel. The base of the sleeve is coupled to the bracket while substantially perpendicular to the bracket. The cross section of the base and the at least one member is substantially U-shaped. In one embodiment, the sleeve has an opening at the back of the device so that the device can slide over a bottom corner of the goal frame. In another embodiment to be used with a lacrosse goal, the bracket is coupled to the sleeve at an angle such that the wheel is perpendicular to the upper crossbar of the lacrosse goal. An alternative embodiment includes a detachable latch extending from the member of the sleeve and located substantially parallel to the base to prevent the goalpost from moving freely on the wheel device.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. §112, ¶6. Moreover, even if the provisions of 35 U.S.C. §112, ¶6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any particular sequence or embodiment.

DETAILED DESCRIPTION OF THE INVENTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1:
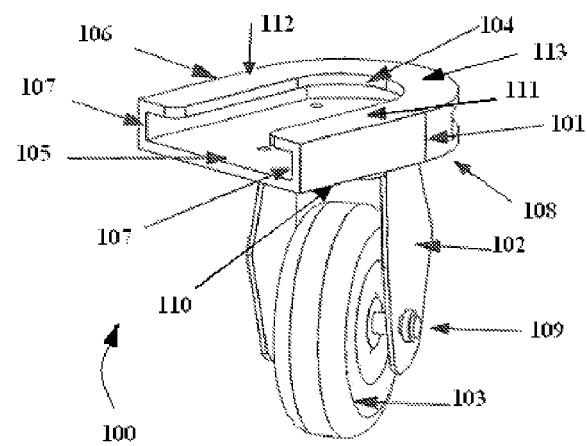
FIG. 1 depicts a perspective view of an embodiment of the removable wheel device from the top.

FIG. 1 illustrates an embodiment of this invention. In this embodiment, the device has a wheel 103 with an axle 109 therethrough, a bracket 102, and a sleeve 101. The bracket 102 may extend in a direction parallel to a radius of the wheel 103. The bracket 102 may be detachable from the base 105. The sleeve 101 has a front portion 108 and a rear portion 110. The sleeve 101 has a base 105, two supports 107, wherein the supports may be sidewalls, and a U-shaped cantilevered member 106 with a first arm 111, a second arm 112, and an arced portion 113 connecting the two. One of ordinary skill in the art would recognize that the arced portion 104 need not be arced, and any shape that connects the two arms 111, 112 would suffice. As one non-limiting example of a removable wheel device, the space surrounded by the cantilevered member 106 is 2" wide and has a 1" radius arced portion 104 at the front end of the U-shaped cantilevered member 106, although one of ordinary skill in the art would recognize that any appropriate dimensions may be used.

Figure 2:
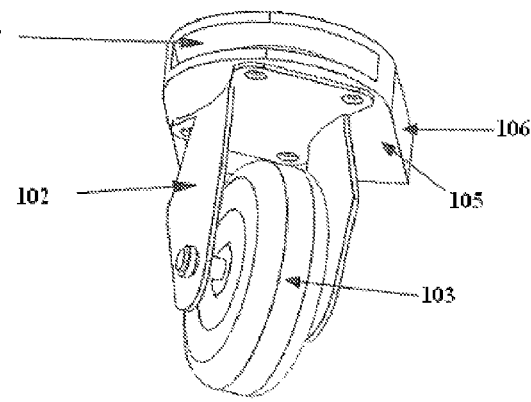
FIG. 2 depicts a perspective view of the removable wheel device as in FIG. 1 from the bottom.

In another implementation, the bracket 102 may rotate relative to the sleeve 101 as illustrated in FIG. 2. This feature makes a goal attached to the removable wheel device easier to steer. The bracket 102 may also comprise or be coupled to a locking mechanism to hold the bracket 102 at a specific angle relative to the sleeve 101. Moreover, in this embodiment, the sleeve 101 has an opening 205 at the front end to leave room for the bottom corner of the goal. For example, the bottom flat iron of a lacrosse goal frame can be of different size due to the different manufacturing techniques adopted. This opening 205 makes a removable wheel device for the lacrosse goal suitable to goals made by different manufactures.

Figure 3:
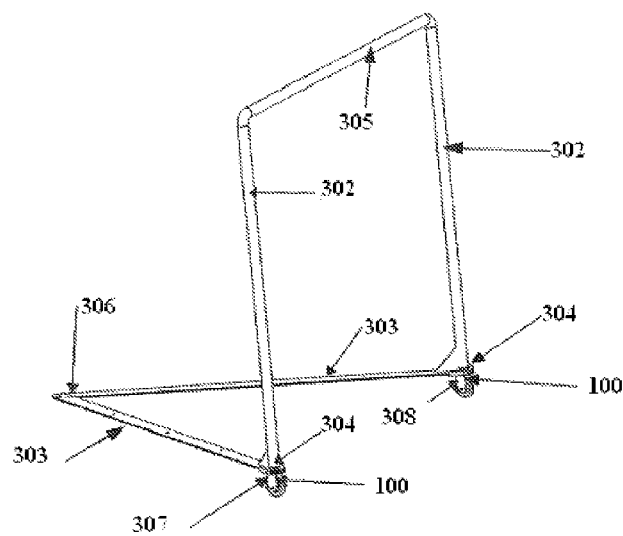
FIG. 3 depicts an implementation of a pair of the removable wheel devices mounted to a lacrosse goal frame.

In one embodiment, two removable wheel devices 100 are used with a lacrosse goal as shown in FIG. 3. To attach the removable wheel devices 100 to the goal, a person may lift the appropriate side of the goal at 307 or 308 and slide the devices 100 over a flat iron 303 and snugly around the goalpost 302 at location 304. When both devices 100 are in place, the person can tilt the goal face side down, while facing the goal, by pulling the cross bar 305 and pivoting the goal over the removable wheel devices 100. When the goal is balanced over the removeable wheel devices 100, a person can pull or push the goal to a different place. Another alternative is to slide the devices 100 on the goal and lift the goal from the triangular point of the flat iron 306. This pivots the goal over the devices 100 at location 304. The goal is now ready to move to another place.

In some embodiments, the distance between the arms 111, 112 of the U-shaped cantilevered member 106 of the sleeve 101 is 2 inches because the vertical goalposts 302 of a lacrosse goal have a diameter of less than 2 inches, and the flat irons 303 attached to the posts 302 at the bottom generally have a width of more than 2 inches. However, if this device 100 were to be used for a different type of goal, one of ordinary skill in the art would readily recognize that any appropriate dimensions are applicable. The bracket 102 may be coupled to the sleeve 101 at an angle such that the wheel 103 is perpendicular to a plane comprising two goalposts 302 and a crossbar 305 of a lacrosse goal.

Figure 4:
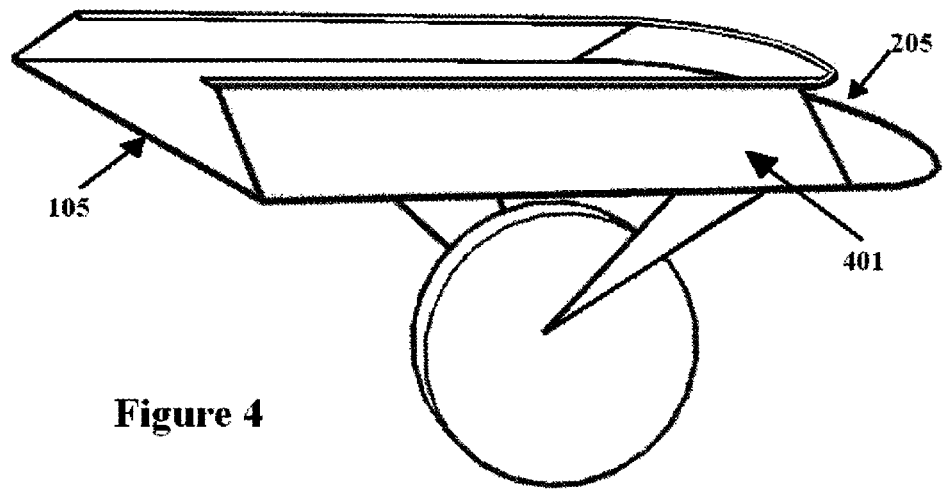
FIG. 4 represents an embodiment of the removable wheel device that has two sidewalls leaning inwards.
Figure 5:
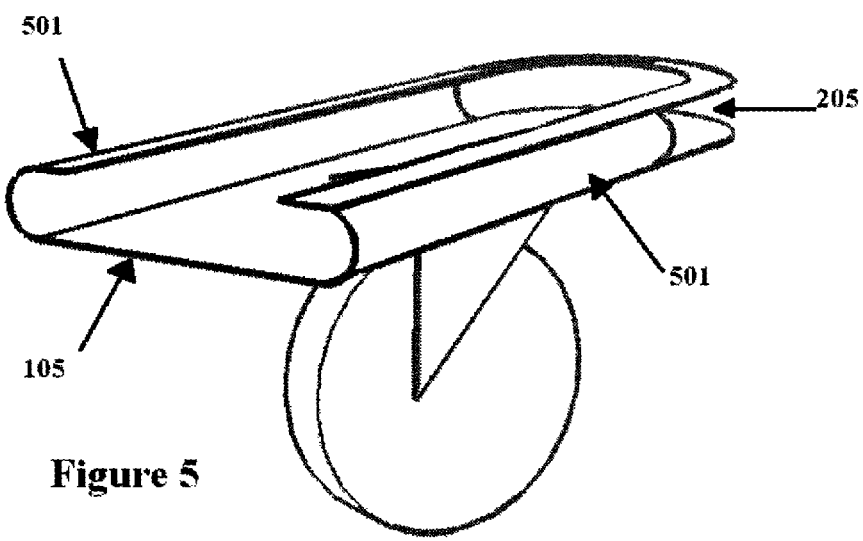
FIG. 5 shows an embodiment of a removable wheel device having curved sidewalls.

Some embodiments may have a member 401 of the sleeve leaning inwards so that the goal may slide into the space formed by the member 401 of the sleeve 101 and the base 105. As shown in FIG. 4, the member 401 of such a device has an opening 205 in the front and the rest is bent inwards. The cross section of the member 401 and the base 105 may be substantially U-shaped. Another embodiment shown in FIG. 5 has a curved sidewall 501 with an opening 205 in the front. The cross section of the sidewall 501 and the base 105 may also be generally U-shaped.

Figure 6:
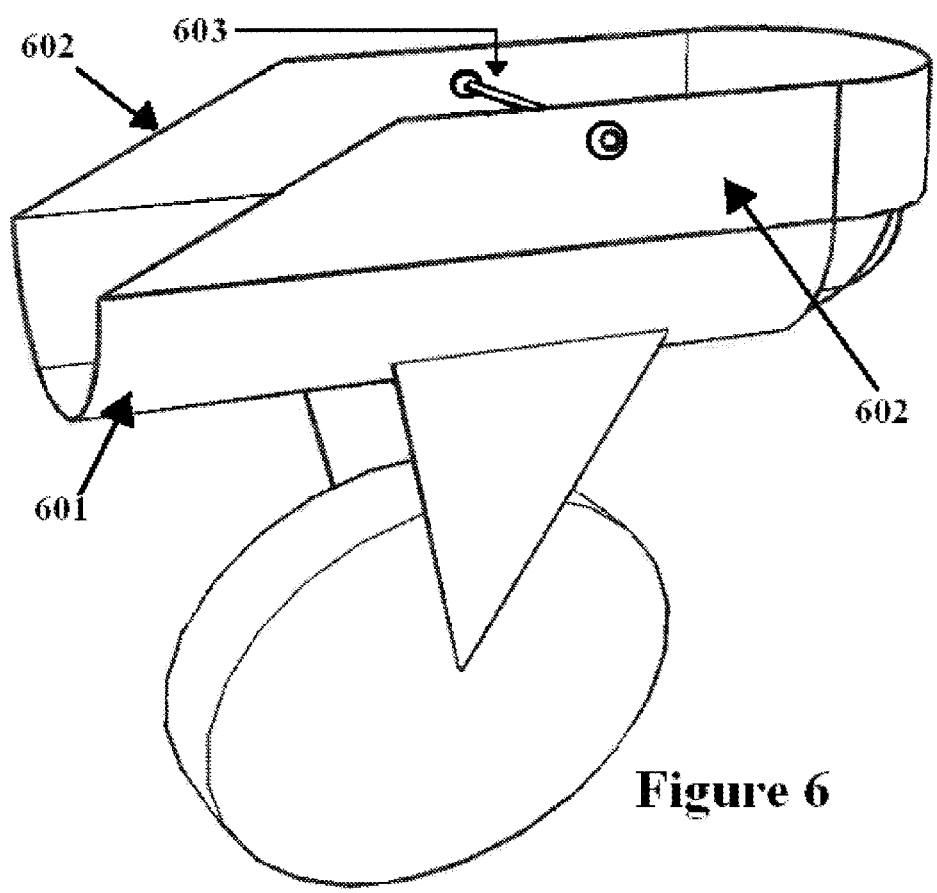
FIG. 6 depicts an embodiment of a removable wheel device having a sleeve that has a curved base, a continuous sidewall, and a latch across the sidewall.

As shown in FIG. 6, an embodiment of the device may have a sleeve with a curved base 601, a continuous sidewall 602, and a detachable latch 603 that traverses the space in between sidewalls 602. The latch 603 may be detached when the bottom of the goal slides in the sleeve 101 and is attached after the goalpost is in position. With this latch 603, the goalpost cannot slide backward or move freely from the wheel device when the goal is being moved.

Figure 7:
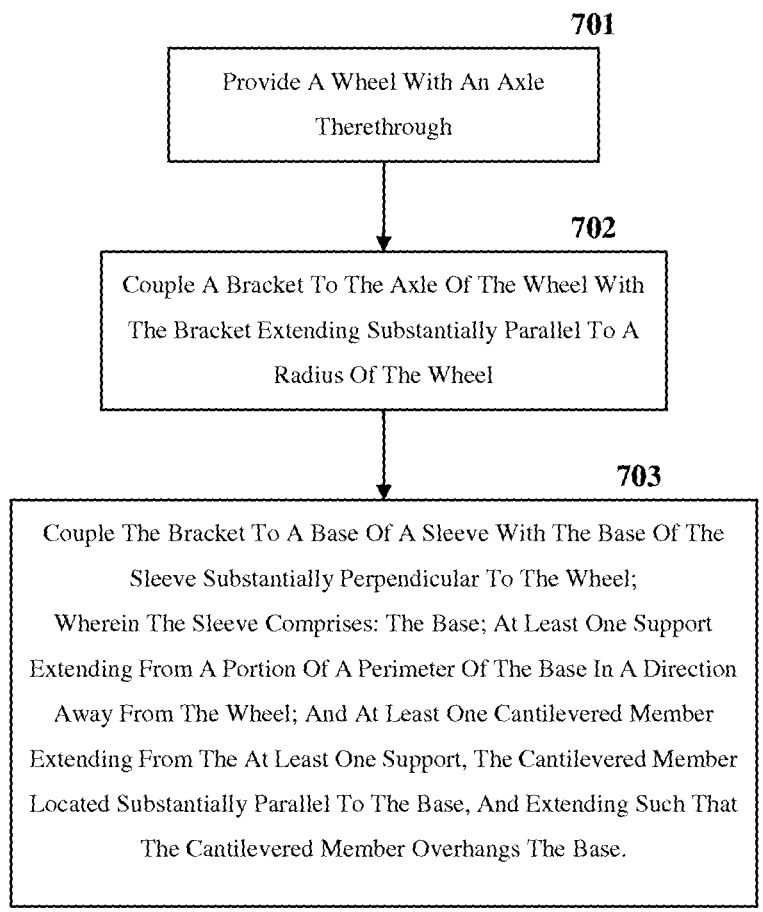
FIG. 7 depicts a method for making a removable wheel device.

Referring to FIG. 7, a method for making a removable wheel device is disclosed. A wheel with an axle therethrough is provided 701. One of ordinary skill in the art would know that many different types of wheels and axles would be possible. A bracket is coupled to the axle with the bracket extending substantially parallel to a radius of the wheel 702. A base of a sleeve is coupled to the bracket. The base may be substantially perpendicular to the wheel. The sleeve may comprise at least one support extending from a portion of a perimeter of the base in a direction away from the wheel. The sleeve may further comprise at least one cantilevered member extending from the at least on support, the cantilevered member located substantially parallel to the base, and extending such that the cantilevered member overhangs the base 703. A person of ordinary skill in the art would know that no specific order of coupling is required, and that a variety of materials, including metal, may be used.

I claim:

1. A removable wheel device for a field game goal, comprising:
    a wheel with an axle therethrough;
    a bracket extending substantially parallel to a radius of the wheel and coupled to the axle of the wheel; and
    a sleeve comprising:
        a substantially U-shaped base that is substantially perpendicular to and coupled to the bracket;
        at least one support extending from a portion of a perimeter of the base in a direction away from the wheel and forming an angle of less than 90 degrees relative to the base;
        at least one cantilevered member extending from the at least one support, the member located substantially parallel to the base, and extending such that the member overhangs the base;
        wherein the at least one cantilevered member comprises at least one arm;
            the substantially U-shape base wherein the first cantilevered member arm is substantially parallel to the second cantilevered member arm and the third cantilevered member arm is substantially arcuate and coupled to the first and second cantilevered member arms; and
            the third cantilevered member arm extending from the support, wherein the support further comprises at least one opening positioned substantially perpendicular to the base and located between the third cantilevered member arm and a U-shaped portion of the base.

2. The removable wheel device of claim 1, wherein the first cantilevered member arm is located a distance of at least two inches from the second cantilevered member arm.

3. The removable wheel device of claim 1, wherein the sleeve further comprises a length no less than five inches measured from the front portion to the rear portion.

4. The removable wheel device of claim 1, wherein the bracket is detachable from the base.

5. The removable wheel device of claim 1, wherein the bracket may rotate relative to the sleeve and the device further comprises a locking mechanism coupled to the rotating bracket.

6. The removable wheel device of claim 1, wherein the bracket is coupled to the sleeve at an angle such that the wheel is perpendicular to a plane comprising two goalposts of a lacrosse goal.

7. The removable wheel device of claim 1, wherein the sleeve further comprises a detachable latch that extends from the first arm to the third arm.

\* \* \* \* \*